US011185782B2

(12) United States Patent
Ito et al.

(10) Patent No.: US 11,185,782 B2
(45) Date of Patent: Nov. 30, 2021

(54) INFORMATION PROCESSING SYSTEM, A NON-TRANSITORY STORAGE MEDIUM HAVING STORED THEREIN AN INFORMATION PROCESSING PROGRAM, AN INFORMATION PROCESSING APPARATUS, AND AN INFORMATION PROCESSING METHOD

(71) Applicant: Nintendo Co., Ltd., Kyoto (JP)

(72) Inventors: Norihito Ito, Kyoto (JP); Tomoya Masuda, Tokyo (JP); Shotaro Ito, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 21 days.

(21) Appl. No.: 16/899,049

(22) Filed: Jun. 11, 2020

(65) Prior Publication Data

US 2020/0391117 A1     Dec. 17, 2020

(30) Foreign Application Priority Data

Jun. 17, 2019   (JP) .............................. JP2019-111902
May 11, 2020   (JP) .............................. JP2020-082989

(51) Int. Cl.
   *A63F 13/69*        (2014.01)
   *A63F 13/58*        (2014.01)
   (Continued)

(52) U.S. Cl.
   CPC .............. *A63F 13/69* (2014.09); *A63F 13/23* (2014.09); *A63F 13/52* (2014.09); *A63F 13/58* (2014.09);
   (Continued)

(58) Field of Classification Search
   CPC ................................. A63F 13/69; A63F 13/58
   See application file for complete search history.

(56) References Cited

U.S. PATENT DOCUMENTS 9,375,636 B1 *  6/2016  Wakeford ............... A63F 13/00
9,403,093 B2 *  8/2016  Harrington ........... A63F 13/792
(Continued)

FOREIGN PATENT DOCUMENTS

JP        2018-47100         3/2018

OTHER PUBLICATIONS

"LINE: Disney Tsum Tsum", LINE Corporation, search date Jun. 13, 2019, 3 pages, https://apps.apple.com/us/app/line-disney-tsumtsum/id867964741.

*Primary Examiner* — Jay Trent Liddle
(74) *Attorney, Agent, or Firm* — Nixon & Vanderhye PC

(57) ABSTRACT

The game system comprises: a first selection unit that performs a first selection in which a game character is selected; a strengthening unit that raises the skill level of the game character on condition that the game character selected in the first selection is already possessed by the user; an effect-enabling unit that enables the game character to be changed in appearance on condition that the game character selected in the first selection is an appearance changing character; an effect applying unit that changes the appearance of the game character that is enabled to be changed in appearance; and a second selection unit that performs a second selection in which an appearance changing ticket applicable to any game character possessed by the user can be selected when the skill level of all types of the game character reaches an upper limit.

19 Claims, 12 Drawing Sheets

(51) Int. Cl.
   *A63F 13/52*      (2014.01)
   *A63F 13/23*      (2014.01)
   *A63F 13/2145*    (2014.01)

(52) U.S. Cl.
   CPC ... *A63F 13/2145* (2014.09); *A63F 2300/1075* (2013.01); *A63F 2300/609* (2013.01); *A63F 2300/65* (2013.01)

(56) References Cited

U.S. PATENT DOCUMENTS

| | | | |
|---|---|---|---|
| 9,452,356 B1* | 9/2016 | Tsao | A63F 13/87 |
| 9,610,493 B1* | 4/2017 | Wei | A63F 13/822 |
| 9,669,316 B2* | 6/2017 | Tsao | A63F 13/795 |
| 9,717,986 B1* | 8/2017 | Kawaguchi | A63F 13/69 |
| 10,080,972 B1* | 9/2018 | McLellan | G06Q 50/00 |
| 2013/0196732 A1* | 8/2013 | Oochi | A63F 13/69 |
| | | | 463/17 |
| 2013/0288766 A1* | 10/2013 | Terashima | A63F 13/12 |
| | | | 463/16 |
| 2015/0335995 A1* | 11/2015 | McLellan | A63F 13/67 |
| | | | 463/25 |
| 2015/0336003 A1* | 11/2015 | Tezuka | A63F 13/792 |
| | | | 463/17 |
| 2017/0326456 A1* | 11/2017 | Kawaguchi | A63F 13/70 |
| 2018/0093187 A1* | 4/2018 | Mabuchi | A63F 13/798 |
| 2018/0114398 A1* | 4/2018 | Cho | A63F 13/2145 |
| 2019/0143219 A1* | 5/2019 | Kawaguchi | A63F 13/792 |
| | | | 463/25 |
| 2019/0255447 A1* | 8/2019 | Tsao | A63F 13/35 |
| 2019/0275422 A1* | 9/2019 | Pieron | G06Q 30/0209 |
| 2019/0279452 A1* | 9/2019 | Yamamoto | A63F 13/92 |

* cited by examiner

INITIAL STATE (FIRST SELECTION)

| RANK | | QUANTITY | INDIVIDUAL SELECTION PROBABILITY | TOTAL SELECTION PROBABILITY |
|---|---|---|---|---|
| FIRST CATEGORY CHARACTER | NORMAL | 5 | 7.92% | 39.6% |
| | APPEARANCE-CHANGED | 5 | 0.2% | 1.0% |
| SECOND CATEGORY CHARACTER | NORMAL | 10 | 5.94% | 59.4% |

FIG.4

IN CASE THAT SKILL LEVEL OF ONE SECOND CATEGORY CHARACTER REACHED THE UPPER LIMIT (FIRST SELECTION)

| RANK | | QUANTITY | INDIVIDUAL SELECTION PROBABILITY | TOTAL SELECTION PROBABILITY |
|---|---|---|---|---|
| FIRST CATEGORY CHARACTER | NORMAL | 5 | 8.23% | 41.16% |
| | APPEARANCE-CHANGED | 5 | 0.21% | 1.04% |
| SECOND CATEGORY CHARACTER | NORMAL | 9 | 6.42% | 57.80% |

FIG.5

IN CASE THAT SKILL LEVEL OF ONE FIRST CATEGORY CHARACTER REACHED THE UPPER LIMIT (FIRST SELECTION)

| RANK | | QUANTITY | INDIVIDUAL SELECTION PROBABILITY | TOTAL SELECTION PROBABILITY |
|---|---|---|---|---|
| FIRST CATEGORY CHARACTER | NORMAL | 4 | 8.72% | 34.90% |
| | APPEARANCE-CHANGED | 4 | 0.22% | 0.88% |
| SECOND CATEGORY CHARACTER | NORMAL | 10 | 6.42% | 64.22% |

FIG.6

IN CASE THAT SKILL LEVELS OF ALL CHARACTERS
REACHED THE UPPER LEVEL (SECOND SELECTION)

| ITEM | QUANTITY | UNIT PRICE | PRICE | REMARKS |
|---|---|---|---|---|
| ITEM 1 | 1 | 120 | 120 | · SELECT 5 ITEMS (ALLOWING OVERLAP)<br>· UNIFORM PROBABILITY |
| ITEM 2 | 1 | 120 | 120 | |
| ITEM 3 | 1 | 120 | 120 | |
| ITEM 4 | 1 | 120 | 120 | |
| ITEM 5 | 1 | 120 | 120 | |
| APPEARANCE CHANGE TICKET | 1 | – | – | · SELECTION PROBABILITY IS 1% |

FIG.7

000# INFORMATION PROCESSING SYSTEM, A NON-TRANSITORY STORAGE MEDIUM HAVING STORED THEREIN AN INFORMATION PROCESSING PROGRAM, AN INFORMATION PROCESSING APPARATUS, AND AN INFORMATION PROCESSING METHOD

CROSS REFERENCE TO RELATED APPLICATION

This nonprovisional application is based on Japanese Patent Application No. 2019-111902 filed with the Japanese Japan Patent Office on Jun. 17, 2019, and Japanese Patent Application No. 2020-082989 filed with the Japanese Patent Office on May 11, 2020; the entire contents of each of which are hereby incorporated by reference.

FIELD

The present disclosure relates to an information processing system, a non-transitory storage medium having stored therein an information processing programs, an information processing apparatus, and an information processing method for acquiring a plurality of types of gaming elements by random selection.

BACKGROUND AND SUMMARY

Conventionally, there has been known a game in which a user possesses a plurality of types of player characters, and the user assigns any one of the player characters possessed by the user to play a game stage, a match, a battle, or the like by using the assigned player character (for example, Japanese Patent Laid-Open No. 2018-47100).

In such a game, the user can increase the type of the player character possessed by drawing the player character by consuming the virtual currency or the like set in the game. The user is given the enjoyment of collecting the player character, and when the player character has different capabilities or skills for each type, the player character is selectively used to improve the taste of the game.

In such a game, the skill level is set for the player character possessed by the user, and when the player character already possessed by the user is selected again in the selection, the skill of the player character is reinforced. Thus, even if the user selected by the random selection the same player character as the player character that he or she already possesses, the user can be benefits.

On the other hand, in a game in which a plurality of types of player characters appear as described above, another version of player character may be prepared in which a change such as a color difference is added to the same player character. Further, such another version of player character may be included in the selection candidates with a small selection probability.

It is an object of the present disclosure to improve the preference of a selection in information processing in which a user acquires a plurality of types of game elements by selection.

An information processing system of one aspect comprises: a memory storing a computer-readable program thereon; and one or more processors. The one or more processors, when executing the computer-readable program, perform: a first selection in which any of a plurality of types of game elements can be selected, each type of game element includes one having an additional effect and one not having an additional effect; strengthening the game element possessed by the user on condition that the game element selected in the first selection is already possessed by the user; enabling to apply the additional effect to the game element in the case where the game element selected in the first selection has the additional effect; applying the additional effect to the game element to which the additional effect can be applied; a second selection in which a selection probability of an additional effect item is higher than that in the first selection on condition that a degree of the strengthening of the plurality of types of the game elements reaches an upper limit; and enabling to apply the additional effect to the game element possessed by the user on condition that the additional effect item is applied to the game element.

According to this configuration, in the first selection in which a game element (e.g., a player character) is selected, when a game element already possessed is selected, the game element can be strengthened, and an additional effect (e.g., changing a version of a game element) can be acquired by the first selection, and when a degree of the strengthening of the game element of each type reaches the upper limit, a second selection is performed, in the second selection an additional effect item can be selected. An additional effect can be applied to an possessed game element by applying the additional effect item to the game element. Thus the entertainment of the selection can be improved. That is, by providing the second selection, even the game element having the additional effect has not been selected in the first selection before the degree of the strengthening of the game element reaches the upper limit, the opportunity to apply the additional effect to the game element is secured.

In the information processing system described above, the one or more processors may further perform: on condition that the degree of the strengthening of the game element reaches an upper limit, lowering the selection probability of the game element reaching the upper limit when performing the first selection, thereby increases a probability that a game element of a type different from the game element having reached the upper limit is selected compared to before lowering the selection probability. According to this configuration, all the game elements can be quickly strengthened to the upper limit. Incidentally, lowering the selection probability includes to set the selection probability as 0. That is, the game element whose degree of strengthening reaches the upper limit may not be selected in the first selection.

In the above information processing system, the one or more processors may further perform: on condition that the degree of the strengthening of the game element reaches the upper limit, setting the selection probability of the game element having reached the upper limit to 0.

In the above information processing system, the one or more processors may further perform: applying the additional effect item to the game element of the type based on the user's designation of the type of the game element possessed by the user. With this configuration, the user can apply the additional effect item to any game element possessed by the user.

In the above information processing system, a game character may be selected as the game element in the first selection; and a game item including the additional effect item may be selected in the second selection. With this configuration, the game character and the game item can be acquired by the first selection and the second selection.

In the above information processing system, the probability that the additional effect item may be selected is 0 in the first selection. With this configuration, the game character is selected and strengthened by the first selection, and then the additional effect item can be selected by the second selection.

In the above information processing system, the one or more processors may further perform: switching the type of the game element by applying the additional effect to the game element in accordance with a user's instruction. With this configuration, the type of the game element can be switched by applying an additional effect to the game element. In addition, even when the type of the game element is switched, the degree of the strengthening of the game element may be maintained.

In the above information processing system, the game element may be in-game content possessed by the user. With this configuration, it is possible to carry out ownership through selection, strengthening, and applying of the additional effect with respect to the content in the game.

In the above information processing system, the one or more processors may perform: changing a display mode of the in-game content by applying the additional effect to the in-game content.

In the above information processing system, the one or more processors may perform: changing a color of at least a part of the in-game content by applying the additional effect to the in-game content.

In the information processing system described above, the game element to be selected in the first selection may include game elements of a first category and a second category, the game elements of the first category may include those having an additional effect and those not having the additional effect, the gaming elements of the second category may include only those that do not have the additional effect.

In the above information processing system, in the first selection, on condition that the degree of the strengthening of the game element does not reach the upper limit, the probability of the game element of the first category being selected may be lower than a probability of the game element of the second category being selected.

In the above information processing system, the one or more processors may further perform: executing a game in which the stronger the game element is, the more the game proceeds advantageously.

In the above information processing system, the additional effect may be independent of whether the game proceeds advantageously.

A non-transitory storage medium of one aspect has stored therein an information processing program that is executed by one or more processors. The information processing program configures the one or more processors to: perform selection of game elements by means of a first selection in which any of a plurality of types of game elements can be selected, each type of game element includes one having an additional effect and one not having an additional effect; strengthen the game element possessed by the user on condition that the game element selected in the first selection is already possessed by the user; enable to apply the additional effect to the game element on condition that the game element selected in the first selection has the additional effect; apply the additional effect to the game element to which the additional effect can be applied; and perform a second selection in which a selection probability of an additional effect item is higher than that in the first selection on condition that a degree of the strengthening of the plurality of types of the game elements reaches an upper limit, wherein the enabling enables to apply the additional effect to the game element possessed by the user on condition that the additional effect item is applied to the game element.

A non-transitory storage medium of one aspect has stored therein an information processing program that is executed by one or more processors. The information processing program configures the one or more processors to: perform selection of game elements by means of a first selection in which any of a plurality of types of game elements can be selected, each type of game element includes one having an additional effect and one not having an additional effect; strengthen the game element possessed by the user on condition that the game element selected in the first selection is already possessed by the user; enable to apply the additional effect to the game element in the case where the game element selected in the first selection has the additional effect; and perform a second selection in which a selection probability of an additional effect item is higher than that in the first selection on condition that a degree of the strengthening of the plurality of types of the game elements reaches an upper limit, wherein the enabling enables to apply the additional effect to the game element possessed by the user on condition that the additional effect item is applied to the game element.

An information processing apparatus of one aspect comprises: a memory storing a computer-readable program thereon; and one or more processors. The one or more processors, when executing the computer-readable program, perform: a first selection in which any of a plurality of types of game elements can be selected, each type of game element includes one having an additional effect and one not having an additional effect; strengthening the game element possessed by the user on condition that the game element selected in the first selection is already possessed by the user; enabling to apply the additional effect to the game element in the case where the game element selected in the first selection has the additional effect; applying the additional effect to the game element to which the additional effect can be applied; a second selection in which a selection probability of an additional effect item is higher than that in the first selection on condition that a degree of the strengthening of the plurality of types of the game elements reaches an upper limit; and enabling to apply the additional effect to the game element possessed by the user on condition that the additional effect item is applied to the game element.

An information processing apparatus of one aspect comprises: a memory storing a computer-readable program thereon; and one or more processors. The one or more processors, when executing the computer-readable program, perform: a first selection in which any of a plurality of types of game elements can be selected, each type of game element includes one having an additional effect and one not having an additional effect; strengthening the game element possessed by the user on condition that the game element selected in the first selection is already possessed by the user; and enabling to apply the additional effect to the game element in the case where the game element selected in the first selection has the additional effect; a second selection in which a selection probability of an additional effect item is higher than that in the first selection on condition that a degree of the strengthening of the plurality of types of the game elements reaches an upper limit; and enabling to apply the additional effect to the game element possessed by the user on condition that the additional effect item is applied to the game element.

An information processing method of one aspect performed in a computer of an information processing apparatus comprises: performing selection of game elements by means of a first selection in which any of a plurality of types of game elements can be selected, each type of game element includes one having an additional effect and one not having an additional effect; strengthening the game element possessed by the user on condition that the game element selected in the first selection is already possessed by the user; enabling to apply the additional effect to the game element in the case where the game element selected in the first selection has the additional effect; applying the additional effect to the game element to which the additional effect can be applied; a second selection in which a selection probability of an additional effect item is higher than that in the first selection on condition that a degree of the strengthening of the plurality of types of the game elements reaches an upper limit; and enabling to apply the additional effect to the game element possessed by the user on condition that the additional effect item is applied to the game element.

BRIEF DESCRIPTION OF THE DRAWINGS

FIG. 4 is a table of a non-limiting example embodiment showing an example of a selection condition of the first selection in an initialization status;

FIG. 5 is a table of a non-limiting example embodiment showing an example of the selection condition of the first selection when the skill level of one second category character reaches the upper limit;

FIG. 6 is a table of a non-limiting example embodiment showing an example of the selection condition of the first selection when the skill level of one first category character reaches the upper limit;

FIG. 7 is a table of a non-limiting example embodiment showing an example of the selection condition of the second selection;

DETAILED DESCRIPTION OF NON-LIMITING EXAMPLE EMBODIMENTS

Hereinafter, a game system according to an embodiment of the present disclosure will be described with reference to the drawings. Note that the embodiments described below are examples of the case where the present disclosure is implemented, and the present disclosure is not limited to the specific configurations described below. In the implementation of the present disclosure, a specific configuration according to the embodiment may be appropriately employed.

Figure 1:
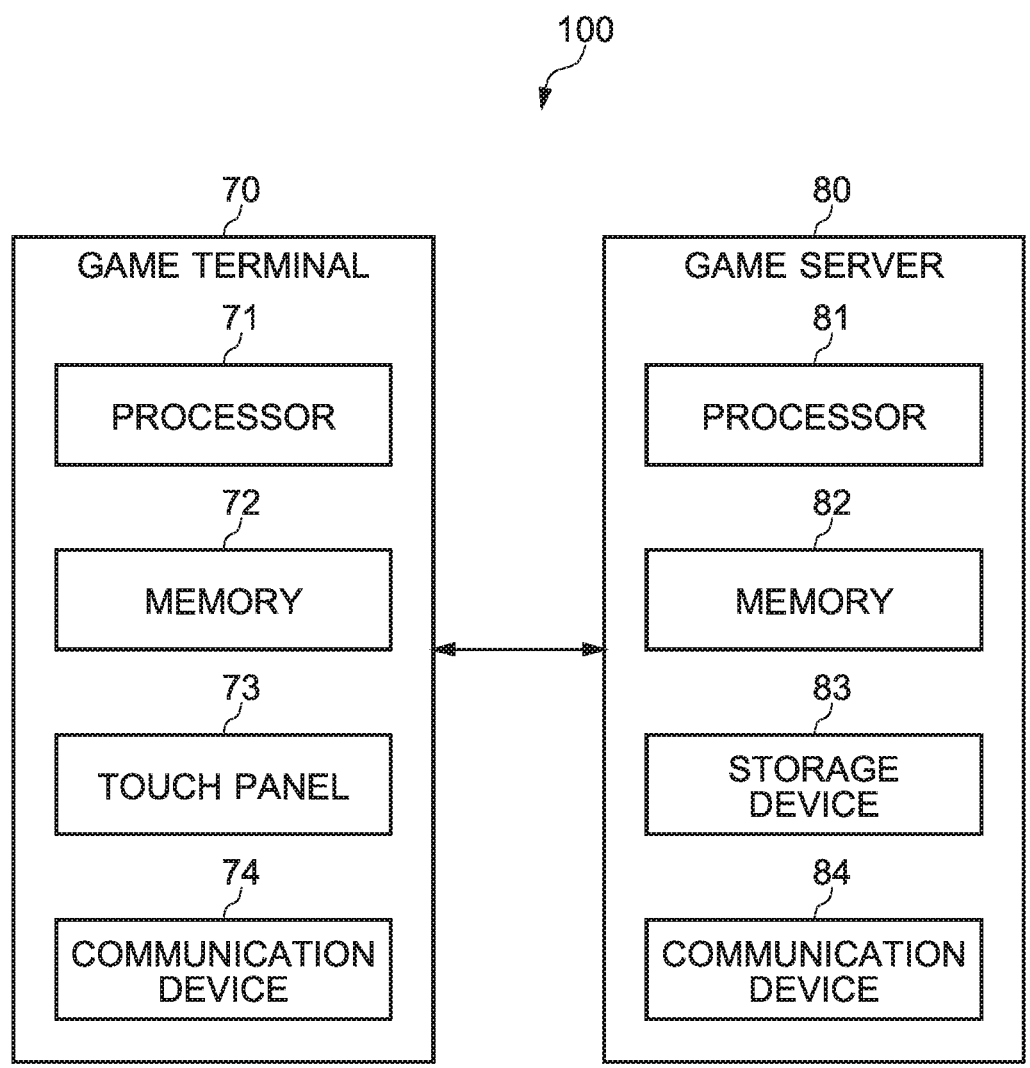
FIG. 1 is a block diagram of a non-limiting example embodiment showing a configuration of an information processing system.

FIG. 1 is a block diagram showing a configuration of an information processing system of a a non-limiting example embodiment. In the present embodiment, the information processing system is configured as a game system that performs information processing related to a game. In the present embodiment, the game system 100 includes a game terminal 70 and a game server 80. The game terminal 70 and the game server 80 include a communication device 74 and a communication device 84, respectively, and can communicate with each other. The game server 80 is provided on a communication network, and a plurality of the game terminals 70 can access the game server 80.

The game terminal 70 includes a processor 71, a memory 72, a touch panel 73, and a communication device 74. The game server 80 includes a processor 81, a memory 82, a storage device 83, and a communication device 84. The game terminal 70 is possessed by the user and is a terminal that operates when the user plays the game. The game terminal 70 may be a general-purpose computer device that performs information processing other than a game, such as a smart phone, or may be a terminal dedicated to a game. The game server 80 is a server managed by a person who provides a game of the present embodiment to a user, and the game server 80 may also function as a variety of information processing servers, or may be a game-only server.

In the game terminal 70 and the game server 80, the processor 71 and the processor 81 execute the game program and the game server program according to the present embodiment, respectively, and the functions described below are constituted. The game program and the game server program may be provided to the game terminal 70 and the game server 80 through a communication network, respectively, or may be provided to the game terminal 70 and the game server 80 through a non-transitory storage medium in which the program is stored.

First, an outline of the game according to the present embodiment will be described. In this game, the user can possess a plurality of types of game characters, a plurality of types of items, and an in-game virtual currency. The game characters, items, and in-game virtual currencies possessed by the user are stored and maintained in the storage device 83 of the game server 80 along with the user ID and the in-game status of the user (e.g., player level, cleared stages, acquired points, etc.) and are updated as necessary. The in-game virtual currency may be acquired by satisfying a predetermined condition in the game, or may be purchased by charging.

The rendering data for rendering the game character or item and displaying it on the touch panel 73 may be stored in the game terminal 70 regardless of whether or not the user possesses the game character or item, and when the user acquires the game character or item, the game character or item may be validated in the game and rendered and reflected in the game. Alternatively, when the user acquires a game character or item, data for rendering the game character or item may be downloaded from the game server 80 to the game terminal 70.

At each stage of the game, the user assigns and sets any of the game characters possessed by the user to start the game. Skills are defined for each game character, and the user can advantageously proceed with the game by the skills corresponding to the game character set at that stage by satisfying predetermined conditions in the game. The degree of strength (skill level) is set for this skill, and raising the skill level is advantageous for the user, for example, the effect becomes strong or the condition for the generation of the skill is alleviated (the skill is easily activated).

The user can acquire the game character by consuming the in-game virtual currency. Which type of the plurality of types of game characters is to be acquired is determined by selection. That is, the user can challenge a selection of the game character by consuming the virtual currency in the game. The plurality of types of game characters are divided into a first category character (first category) and a second category character (second category). To each game character belonging to the first category, an appearance-changed character, which is described later, as another version of the game character is prepared.

Figure 2:
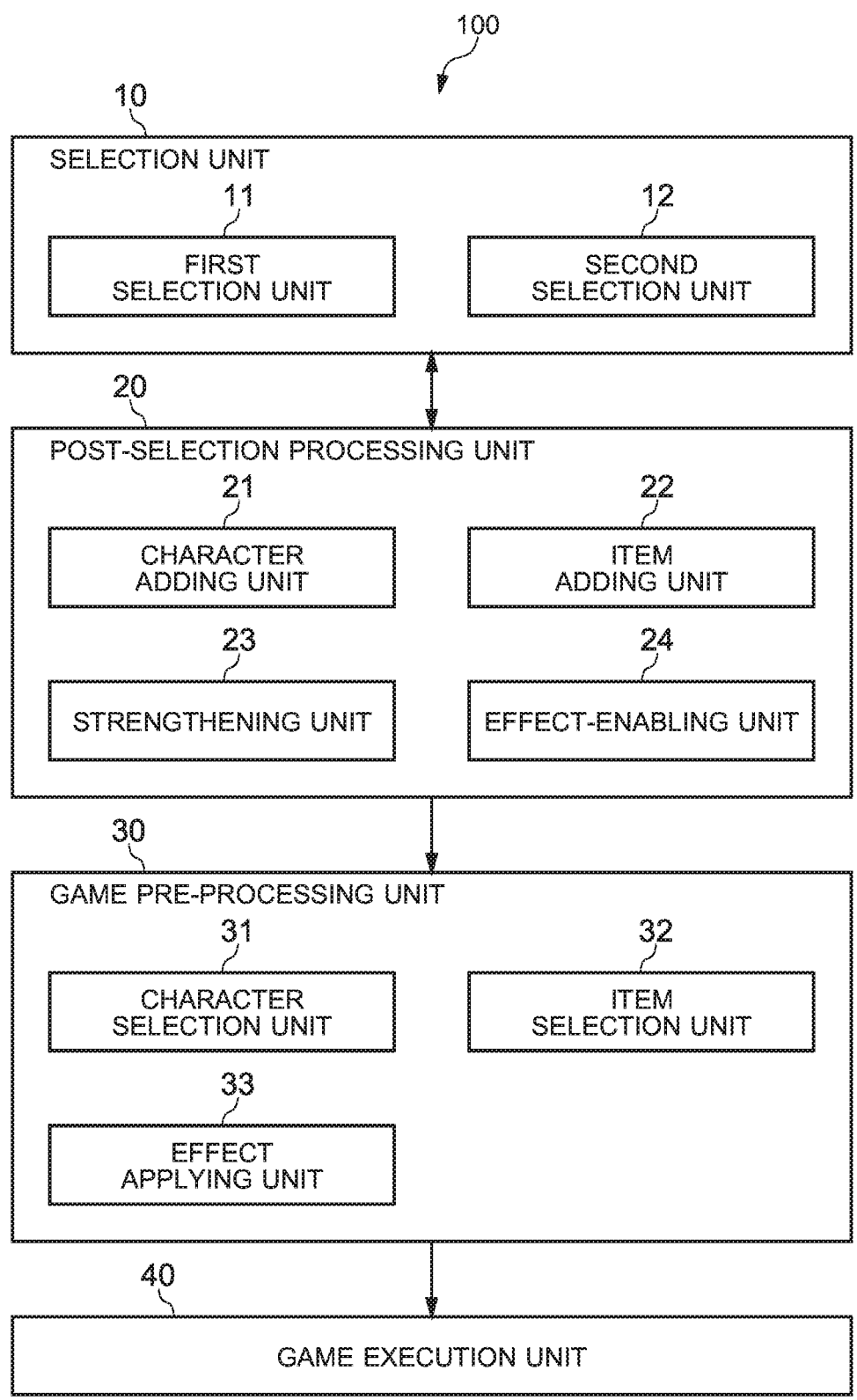
FIG. 2 is a diagram of a non-limiting example embodiment showing a functional configuration of an information processing system.

FIG. 2 is a diagram of a non-limiting example embodiment showing a functional configuration of an information processing system. The game system 100 as an information processing system includes a selection unit 10, a post-selection processing unit 20, a game pre-processing unit 30, and a game execution unit 40. Although FIG. 2 shows a configuration for explaining the present disclosure, the game system 100 may have other functions in addition to the configuration shown in FIG. 2. In the present embodiment, the selection unit 10 and the post-selection processing unit 20 are provided in the game server 80, and the game pre-processing unit 30 and the game execution unit 40 are provided in the game terminal 70. An instruction by the user is performed by the touch panel 73 as an input unit of the game terminal 70, and various screens are displayed on the touch panel 73 as a display unit of the game terminal 70.

The selection unit 10 includes a first selection unit 11 and a second selection unit 12 to perform selection of game characters and items. When a selection is performed by the selection unit 10, the post-selection processing unit 20 performs processing to reflect the selection result. The post-selection processing unit 20 includes a character adding unit 21, an item adding unit 22, the strengthening unit 23, and an effect-enabling unit 24.

Figure 3:
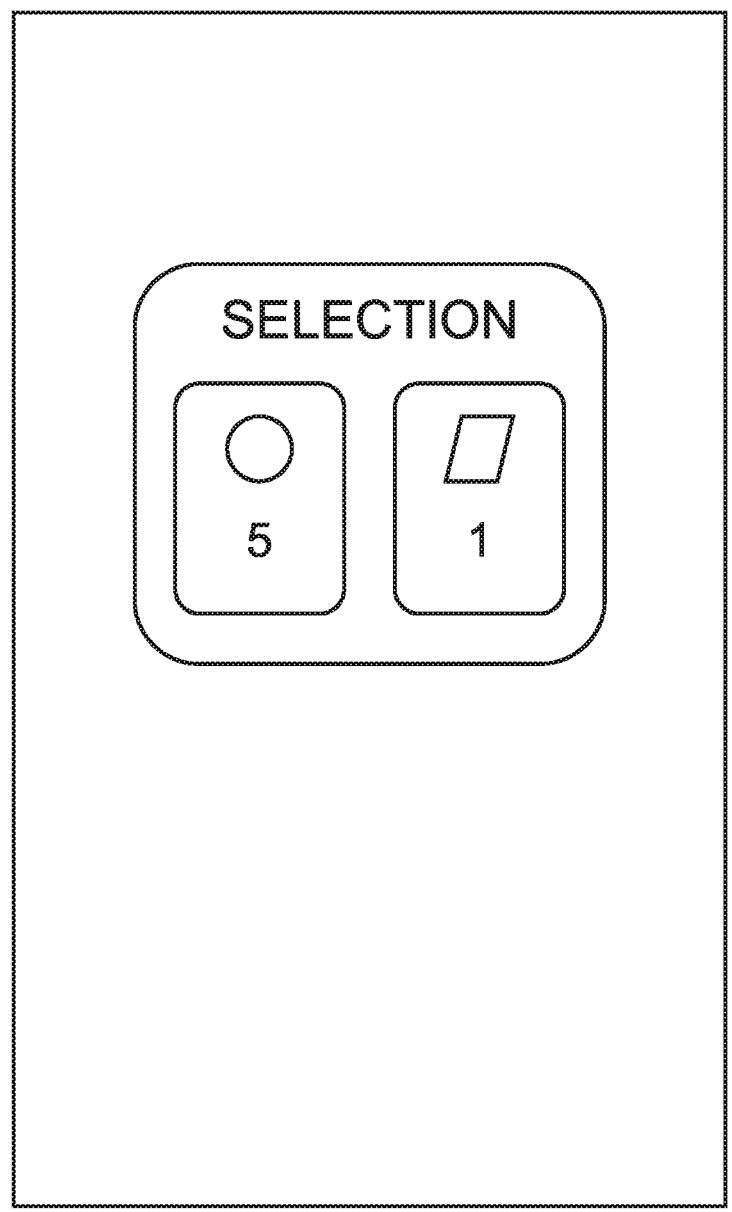
FIG. 3 is a diagram of a non-limiting example embodiment showing an example of a selection screen for starting selection.

FIG. 3 is a diagram of a non-limiting example embodiment showing examples of selection screens for starting selection. As described above, the user can challenge the selection by consuming the in-game virtual currency. In the present embodiment, the first virtual currency and the second virtual currency are used as the in-game virtual currency. In the example of FIG. 3, the consumption amount when the first virtual currency is consumed to challenge a selection is 5 sheets, and the consumption amount when the second virtual currency is consumed to challenge the selection is 1 sheet. The selection unit 10 starts the selection process by being tapped either the button of the first virtual currency of 5 sheets or the button of the second virtual currency of 1 sheet in FIG. 3.

The first selection unit 11 performs a first selection in which any of a plurality of types of game characters can be randomly selected. In the present embodiment, the game characters that can be selected in the first selection are the game characters including the first category character and the second category character, and the items including an additional effect items described later are not the selection candidates. That is, in the present embodiment, the selection probability of the additional effect item in the first selection is 0. In the first selection, the game character already possessed by the user is also a selection candidate. Therefore, the game character already possessed by the user may be selected (appeared).

When the first selection is performed by the first selection unit 11 and a certain game character is selected, the character adding unit 21 refers to the storage device 83 and confirms that the user does not yet possess the game character, and newly adds the game character as the game character possessed by the user.

On the other hand, when the first selection is performed by the first selection unit 11 and a certain game character is selected, and the strengthening unit 23 refers to the storage device 83 and confirms that the user already possesses the game character, the strengthening unit 23 strengthens the game character by raising the skill level of the game character. However, a specification may be adopted in which, for example, after the skill level 3, the game character needs to be obtained repeatedly a plurality of times in order to raise the skill level. In the present embodiment, the skill level is set any from 1 to 10.

As described above, in the first category character of the game characters, a normal first category character (hereinafter, referred to as "normal character") and a first category character as another version of character in which the appearance of the normal character is changed (hereinafter, referred to as "appearance-changed character") are prepared. The selection candidate of the first selection includes the appearance-changed character of the first category character. In the present embodiment, although the appearance of the appearance-changed character is different from that of the normal character, there is no other advantage, and in particular, there is no effect that the game can be advanced more advantageously than that of the normal character. Alternatively, the appearance-changed character may have characteristics superior to the normal character, such as being able to proceed more advantageously in the game compared to the normal character.

When the appearance-changed character is drawn in the first selection, the post-selection processing unit 20 performs processing of adding the game character by the character adding unit 21 or reinforcing the game character by the strengthening unit 23 in the same manner as described above, and in addition, the effect-enabling unit 24 makes it possible to change the appearance of the game character as an additional effect. That is, the appearance-changed character drawn in the first selection is a game character having an additional effect of changing the appearance of the game character.

When the skill level of a certain game character reaches the upper limit of 10 as a result of the strengthening unit 23 raising the skill level of the game character every time the game character has been selected in an overlapping manner by the first selection of the first selection unit 11, the first selection unit 11 excludes the game character from the selection candidates of the first selection and prevents the game character from being selected in the subsequent first selection.

FIG. 4 is a table of a non-limiting example embodiment showing examples of the selection condition of the first selection in initialization status. In this example, the five first category characters and ten second category characters are prepared as the selection candidate. Each of the five first category characters has an appearance-changed character, so there are five different appearance-changed characters.

In the example of FIG. 4, the selection probability of each normal character is 7.92%, and the probability of selecting any one of the five first category characters is 39.6% (7.92%×5 types). The selection probability of each appearance-changed character is 0.2%, and the probability of selecting any of the five appearance-changed characters is 1.0% (0.2%×5 types). Further, the selection probability of each second category character is 5.94%, and the probability of selecting any of the second category characters is 59.4% (5.94%×10 types).

That is, in the first selection, the selection probability of the first category character is set to be lower than the selection probability of the second category character, and the selection probability of the appearance-changed character is set to be much lower than the selection probability of the normal character.

FIG. 5 is a table of a non-limiting example embodiment showing examples of the selection condition of the first selection when the skill level of one second category character reaches the upper limit. Since the second category character whose skill level reaches the upper limit has been excluded from the selection candidates of the first selection, the number of the second category characters has been reduced from 10 to 9. Along with the exclusion of some of the selection candidates, the respective selection probabilities of the normal characters, the respective appearance-changed characters, and the remaining second category characters are all set to be high. At this time, the respective selection probabilities are adjusted so that each of the ratio of the probability of selecting any of the normal characters, the ratio of the probability of selecting any of the appearance-changed characters, and the ratio of the probability of selecting any of the second category characters is close to the ratio of the initial state shown in FIG. 4.

FIG. 6 is a table of a non-limiting example embodiment showing examples of the selection condition of the first selection when the skill level of one first category character reaches the upper limit. Since the first category character whose skill level having reached the upper limit is excluded from the selection candidates of the first selection, the number of normal characters and the number of appearance-changed characters have been both reduced from 5 to 4. With the exclusion of some of the selection candidates, the respective selection probabilities of the remaining normal characters, appearance-changed characters, and second category characters are set to be high. Also at this time, the respective selection probabilities are adjusted so that each of the ratio of the probability of selecting any of the normal characters, the ratio of the probability of selecting any of the appearance-changed characters, and the ratio of the probability of selecting any of the second category characters is close to the ratio of the initial state shown in FIG. 4.

When the skill levels of all the game characters reach the upper limit, all the game characters are excluded from the selection candidates of the first selection, and there are no game characters that can be selected. Therefore, the selection unit 10 causes the second selection unit 12 to perform a second selection in which an item including an additional effect item can be randomly selected when the degree of strengthening (skill level) of a plurality of types of game characters reaches the upper limit of 10.

FIG. 7 is a table of a non-limiting example embodiment showing examples of the selection condition of the second selection. In the second selection, a set of five items is selected. In the second selection, five items are arbitrarily selected from the items 1 to 5 by permitting duplication. The selection probability of each item when selecting the set of five items is uniform. In the second selection, the appearance change ticket as an additional effect ticket is selected in addition to the set of five items with a probability of 1%. In the selection of items, instead of the above, six or more types of items may be set as selection targets, and five items may be selected so that there is no overlap of items.

When the appearance change ticket as an additional effect item is selected and the appearance change ticket is applied by the user to a first category character, the effect-enabling unit 24 makes the first category character to be capable of changing its appearance. The user may assign any of the first category characters from his possess first category character that does not possess the appearance-changed character to apply the appearance change ticket. The appearance change ticket can be applied to one type of first category character per ticket.

Figure 8:
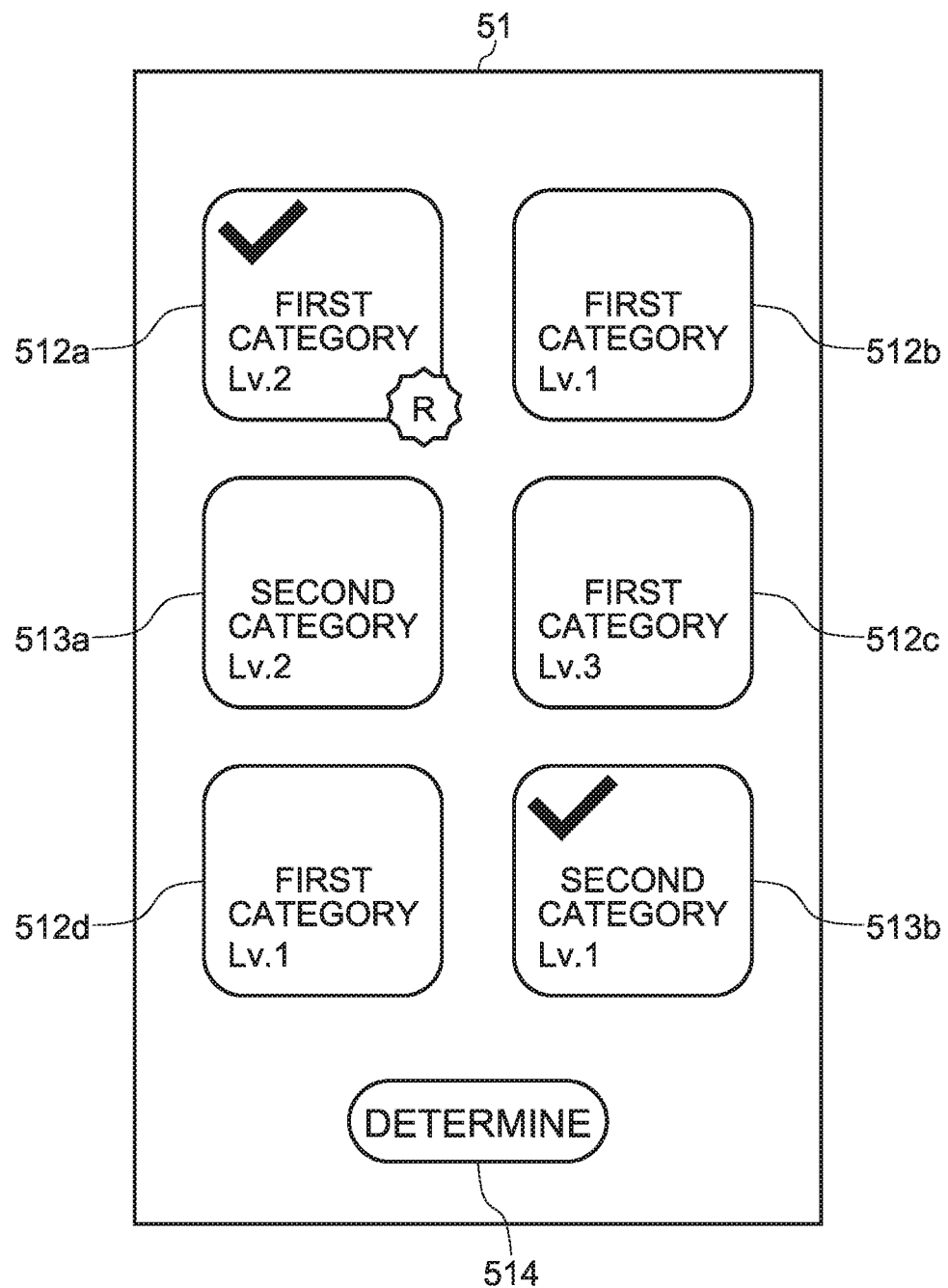
FIG. 8 is a diagram of a non-limiting example embodiment showing an example of a character assignment screen.

Hereinafter, the processing of the game pre-processing unit 30 and the game execution unit 40 will be described with reference to an example of a screen in the game terminal 70. FIG. 8 is a diagram of a non-limiting example embodiment showing an example of a character assignment screen. The character assignment screen 51 is a screen for assigning a game character to be set in the game.

On the character assignment screen 51, icons 512a to 512d of the first category character, icons 513a to 513b of the second category character, and a determination button 514, each of which can be assigned, are displayed. Icons 512a to 512d of the first category character and icons 513a to 513b of the second category character include a signage indicating whether the game character is the first category character or the second category character, or a signage indicating a skill level. One character from the first category characters and one character from the second category characters can be assigned, and a check marks are added on icons of the assigned characters.

Further, an icon 512a of the first category character capable of appearance change is indicated a mark of "R". The user can assign a game character by tapping the icon in the character assignment screen 51, and a check mark is displayed on the icon of the assigned game character.

The game pre-processing unit 30 includes a character assignment unit 31, an item assignment unit 32, and an effect applying unit 33. The character selection unit 31 displays a character assignment screen 51, and assigns a game character according to a user's assignment operation (tap of the icon) on the character assignment screen 51. When the determination button 514 is instructed, the character assignment unit 31 determines the assigned game character as a game character to be used in the game.

Effect applying unit 33, when the first category character assigned in the character assignment unit 31 is capable of changing its appearance, changes the appearance of the first category character used in the game in accordance with the instruction of the user.

Figure 9:
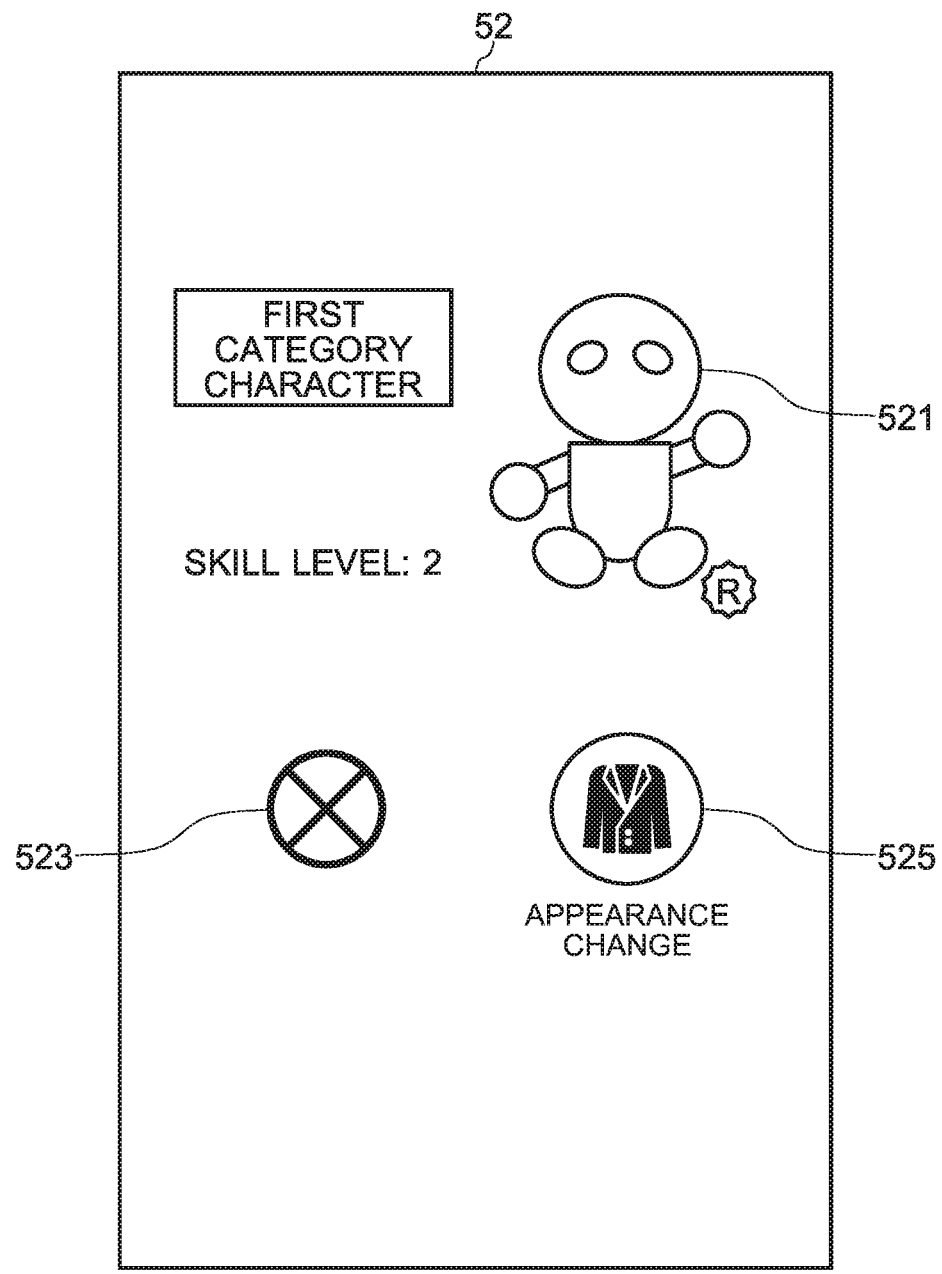
FIG. 9 is a diagram of a non-limiting example embodiment showing an example of a character screen.
Figure 10:
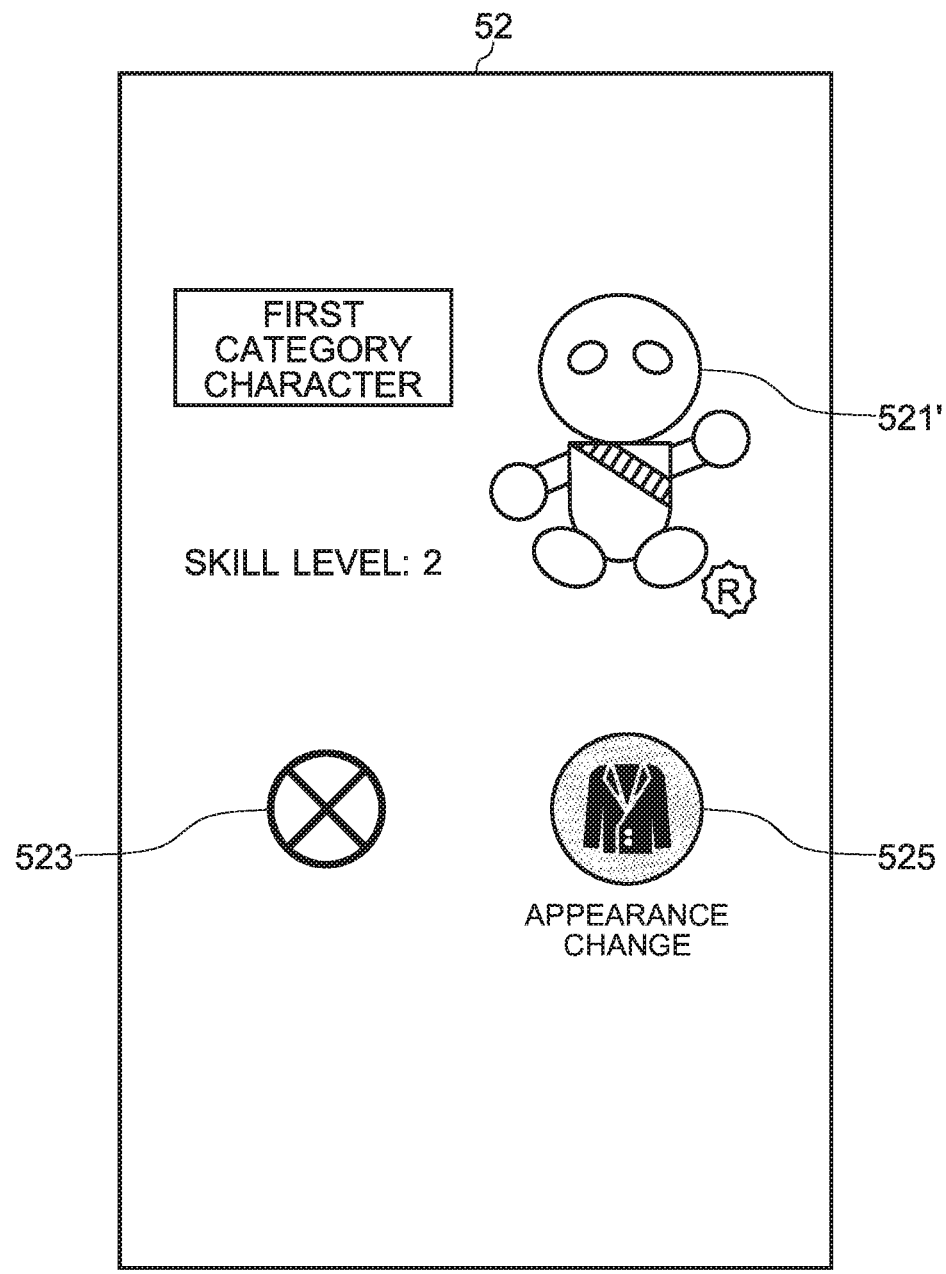
FIG. 10 is a diagram of a non-limiting example embodiment showing an example of a character screen.

FIGS. 9 and 10 are diagrams of a non-limiting example embodiment showing examples character screens. User can change the appearance of the first category character by the character screen 52. FIGS. 9 and 10 are examples of the character screen of the first category character whose appearance can be changed. In the character screen 52, a first category character 521, the screen erasure button 523, and the appearance change button 525 is provided. In FIG. 9, a normal character 521 is displayed, and in FIG. 10, an appearance-changed character 521' is displayed.

When the appearance change button 525 of FIG. 9 is tapped, the effect applying unit 33 changes the normal character 521 to the appearance-changed character 521' and displays the character screen 52 of FIG. 10. When the appearance change button 525 of FIG. 10 is instructed, the effect applying unit 33 changes the appearance-changed character 521' to the normal character 521 and displays the character screen 52 of FIG. 9. In the present embodiment, the appearance-changed character 521' is changed the appearance by adding a pattern to the normal character 521, specifically, adding a sash to the body portion. The change of the appearance is not limited to this, and for example, a color of a part of the normal character 521 may be changed.

The item assignment unit 32 assigns an item to be used in the game. When the item to be used by the user is assigned, the effect corresponding to the assigned item is generated in the game.

The game execution unit 40 executes the game described above. When the appearance of the game character is changed, the changed appearance is applied in the game execution screen.

Figure 11:
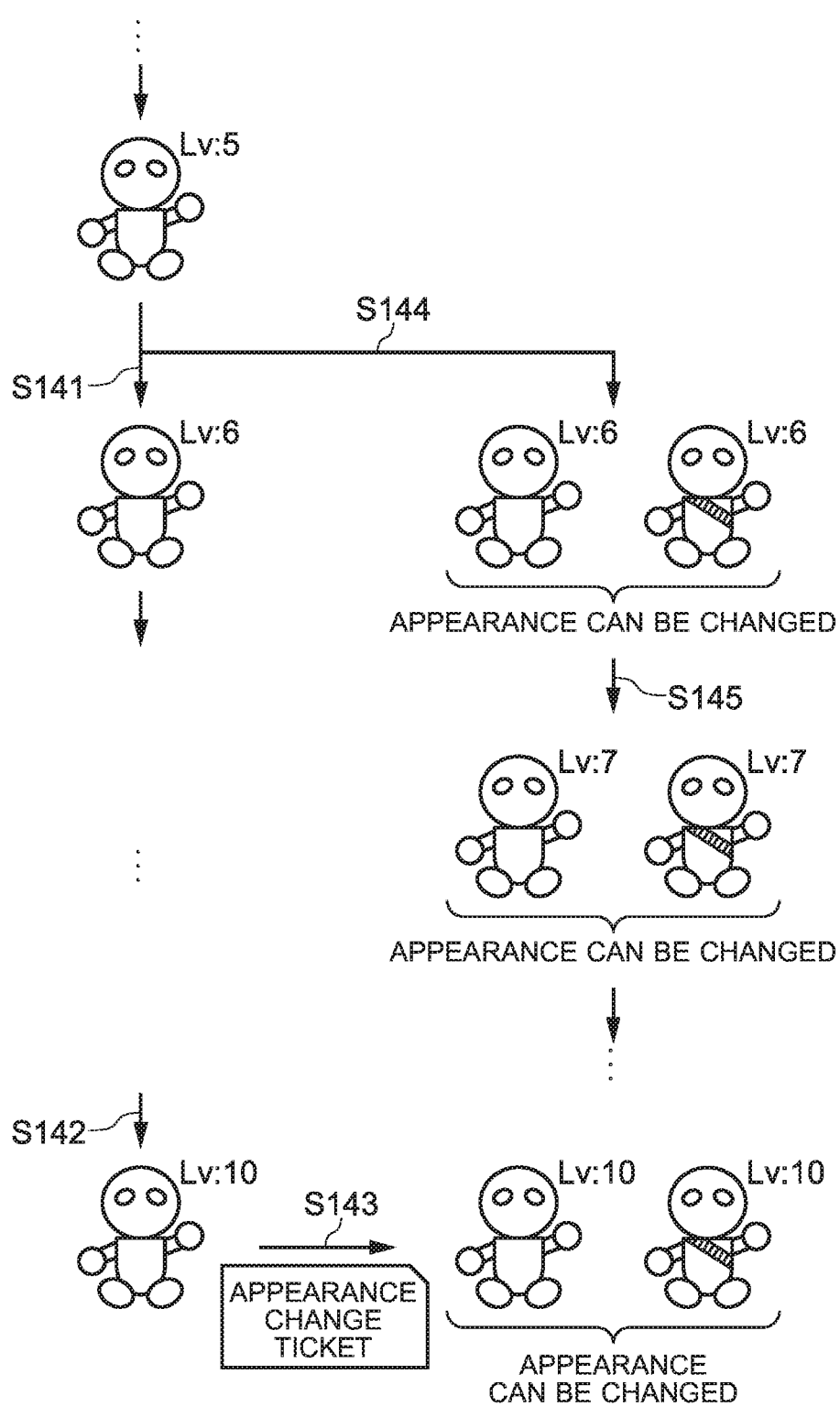
FIG. 11 is a diagram of a non-limiting example embodiment showing a process of raising skill levels of a game character.

FIG. 11 is a diagram of a non-limiting example embodiment showing a process of raising skill levels game characters. In the example of FIG. 11, the game character has been selected in an overlapping manner until the skill level reaches 5, and the appearance-changed character has not been selected by that time. In the next first selection, when the normal character is selected (step S141) and then continues to be selected whereby the skill level reaches the upper limit of 10 (step S142), the selection unit 10 starts the second selection by the second selection unit 12 instead of the first selection by the first selection unit 11 on condition that the skill level of all the other game characters also reaches the upper limit.

In the second selection, when the appearance change ticket is selected and the user applies the appearance change ticket to the game character (step S143), the effect-enabling unit 24 enables the game character to change its appearance.

On the other hand, when the skill level is 5, that is, when the skill level has not yet reached the upper limit, and the appearance-changed character of the game character is selected (step S144), the strengthening unit 23 raises the skill level of the game character, and the effect-enabling unit 24 enables the appearance change.

Thereafter, when the game character is further selected, the effect-enabling section 24 maintains the state in which the appearance of the game character can be changed, and the strengthening unit 23 raises the skill level of the game character in step S145.

Figure 12:
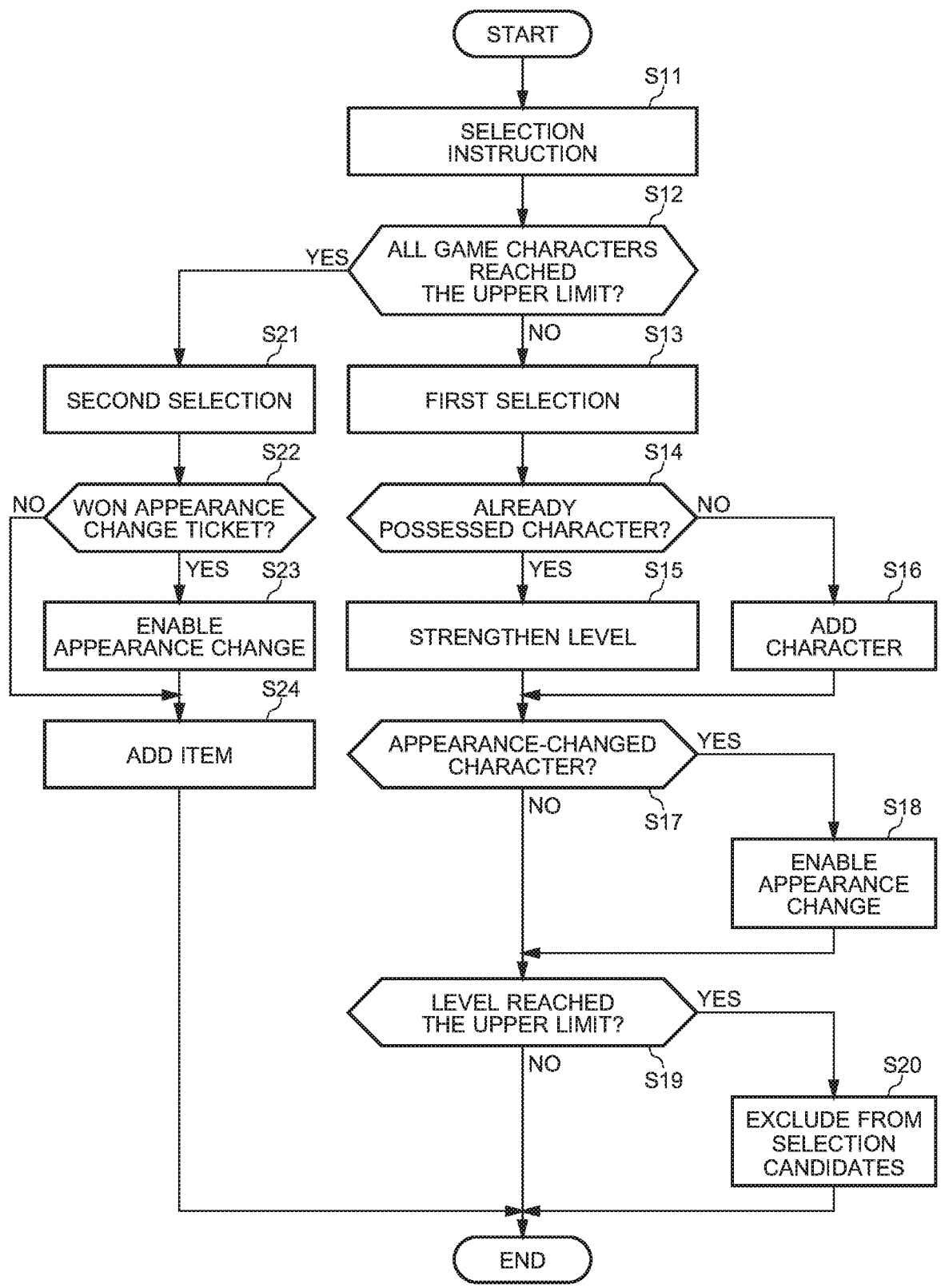
FIG. 12 is a flowchart of an information processing process of a non-limiting example embodiment.

FIG. 12 is a flowchart of an information processing process of a non-limiting example embodiment. The flow chart of FIG. 12 shows the flow of selection and post-selection processing. When the user gives a selection instruction on the selection screen of FIG. 3 (step S11), the selection unit 10 determines whether or not the skill levels of all the game characters have reached the upper limit (step S12). When there remains a game character whose skill level has not reached the upper limit (NO in step S12), the first selection unit 11 performs a first selection (step S13).

In step S14, the post-selection processing unit 20 determines whether the game character selected in the first selection is a game character already possessed by the user. If the game character is already possessed by the user (YES in step S14), the strengthening unit 23 raises the skill level of the game character (step S15). On the other hand, if the selected game character is a game character not yet possessed by the user (NO in step S14), the character addition unit 21 newly adds the character as a character possessed by the user (step S16).

After the strengthening unit 23 raises the skill level of the game character or the character adding unit 21 adds the game character, the post-selection processing unit 20 determines whether or not the selected game character is an appearance-changed character in step S17. When the character is an appearance-changed character (YES in step S17), the effect-enabling unit 24 enables the game character to be changed in appearance (step S18).

When the selected character is not an appearance-changed character (NO in step S17), or the selected character is an appearance-changed character and the effect has been enabled to be applied, it is determined whether or not the skill level of the game character has reached the upper limit (step S19). When the skill level of the game character has reached the upper limit (YES in step S19), the game character is excluded from the selection candidates of the first selection (step S20), and the process is terminated. If the skill level of the game character has not reached the upper limit (NO in step S19), the process ends without the exclusion.

On the other hand, if the skill levels of all the game characters have reached the upper limit (YES in step S12), and thus all the game characters have been excluded from the selection candidates of the first selection when there is a selection instruction, the second selection unit 12 performs the second selection (step S21). In step S22, the post-selection processing unit 20 determines whether or not the appearance change ticket has been selected in the second selection. When the appearance change ticket was not selected but only the items were selected in the second selection (NO in step S22), the item adding unit 22 adds the selected items as items possessed by the user (step S24), and ends the processing.

When the appearance change ticket is selected in addition to the set of five items in the second selection (YES in step S22), the effect-enabling unit 24 enables the appearance change by applying an effect to the corresponding game character in accordance with an effect application instruction designating the game character to be applied from the user (step S23), and the item adding unit 22 adds the selected items as items possessed by the user (step S24), and ends the processing.

As described above, according to a non-limiting example embodiment information processing system, in the first selection for selection of a game character, when a game character already possessed by the system is selected in duplicate, it is possible to raise the skill level of the game character, it is also possible, by the first selection, to acquire an appearance-changed character that allows the appearance of the game character to be changed, and when the skill level of each type of game character reaches the upper limit, it is possible to improve the entertainment of the selection because the second selection is performed in which an appearance change ticket that allows the appearance of the game character to be changed by applying it to the possessed game character can be selected. That is, by providing the second selection, even after the skill level of the game character reaches the upper limit without selecting the appearance-changed character in the first selection, the opportunity to change the appearance of the game character is secured.

The above embodiments are illustrative only, and the present disclosure should not be limited to the above embodiments. Various modified examples will be described below. Although an example in which the information processing system is configured as a game system has been described in the above embodiment, the information processing system of the present disclosure is not limited to a game system, and may be, for example, a simulation system or the like.

In the above embodiment, the game system 100 includes the game terminal 70 and the game server 80, the selection unit 10 and the post-selection processing unit 20 are provided in the game server 80, and the game pre-processing unit 30 and the game execution unit 40 are provided in the game terminal 70, however, these components may be provided in either the game terminal 70 or the game server 80.

Furthermore, all the configurations shown in FIG. 2 may be provided in the game terminal 70 or the game server 80. At this time, the game terminal 70 or the game server 80 having all the configurations shown in FIG. 2 corresponds to the information processing apparatus. Note that, even when all the configurations are provided in the game server 80, the game terminal 70 is provided with a portion for giving various instructions including a selection instruction, an effect application instruction, and a game instruction, and a portion for displaying various screens including a selection screen (see FIG. 3), a character screen (see FIGS. 9 and 10), a game screen, and the like.

The game described in the above embodiment may be any type of game, such as an action game, a role-playing game, or any other type of game.

Further, in the above embodiment, an example has been described in which the game element to be the target of the first selection is the game character, but the game element of the present disclosure is not limited to the game character, and may be, for example, an item used by the game character. In the second selection, the game element serving as a selection candidate together with the additional effect item is an item, but the game element serving as a selection candidate together with the additional effect item in the second selection is not limited to this, and may be, for example, an in-game virtual currency.

Further, in the above embodiment, an example has been described in which the item is not a selection candidate in the first selection, but, the item as well as the game character may be included in the selection candidate of the first selection, and in this case, the additional effect item may or may not be included in the item. In the first selection, the game character whose skill level has already reached the upper limit is excluded from the selection candidates of the first selection, but may not be excluded. In this case, the selection probability of the game character whose skill level reaches the upper limit may be set lower than that of other game characters.

Further, in the above embodiment, when the appearance-changed character is acquired or the appearance change ticket is applied to the first category character by the user, the effect-enabling section 24 enables the appearance of the first category character to be changed, and the effect application section 33 changes the appearance of the first category character between the normal character and the appearance-changed character in accordance with the user's appearance change instruction. That is, the user may assign and use a normal character and an appearance-changed character after the user acquires an appearance-changed character or after the user applies an appearance change ticket to a first category character.

However, the present disclosure is not limited to this, and for example, when the appearance-changed character of the first category character is selected, or when the appearance change ticket is applied to a first category character for which the user has an appearance change ticket, the effect-enabling unit 24 may change the appearance of the first category character while the effect applying unit 33 may automatically change the appearance of the first category character. In this case, the portion identifying the first category character corresponding to the selected appearance-changed character and the the first category character specified as the application target of the appearance change ticket corresponds to the effect-enabling unit 24. Also, in this case, when the appearance-changed character is acquired or a user applies the appearance change ticket to the first category character, the first category character may be changed from the normal character to the appearance-changed character and the normal character may not be used any more in the game.

Further, in the above embodiment, the additional effect is a change in appearance, and this change in appearance does not allow the game to proceed advantageously, but instead, the game may be proceeded advantageously by, for example, raising the skill level of the game character in question, in addition to or instead of the change in appearance.

Further, in the above embodiment, the appearance change is performed to the extent that a slight pattern change is made to the normal character, but the appearance-changed character may have a greatly different appearance including a shape from that of the normal character, for example, as an evolutionary form of the normal character, or may change only the color of the game character. The additional effect may not be a change in appearance, and may be, for example, a change in the movement of the game character or the sound emitted by the game character.

The invention claimed is:

1. An information processing system comprising:
a memory storing a computer-readable program thereon; and
one or more processors, when executing the computer-readable program, that perform:
a first selection in which any of a plurality of types of game elements can be selected, each type of game element includes one having an additional effect and one not having an additional effect;
strengthening the game element possessed by the user on condition that the game element selected in the first selection is already possessed by the user;
enabling to apply the additional effect to the game element in the case where the game element selected in the first selection has the additional effect;
applying the additional effect to the game element to which the additional effect can be applied;
a second selection in which a selection probability of an additional effect item is higher than that in the first selection on condition that a degree of the strengthening of the plurality of types of the game elements reaches an upper limit; and
enabling to apply the additional effect to the game element possessed by the user on condition that the additional effect item is applied to the game element.

2. The information processing system according to claim 1, wherein, the one or more processors further perform: on condition that the degree of the strengthening of the game element reaches an upper limit, lowering the selection probability of the game element reaching the upper limit when performing the first selection, thereby increases a probability that a game element of a type different from the game element having reached the upper limit is selected compared to before lowering the selection probability.

3. The information processing system according to claim 2, wherein, the one or more processors further perform: on condition that the degree of the strengthening of the game element reaches the upper limit, setting the selection probability of the game element having reached the upper limit to 0.

4. The information processing system according to claim 1, wherein the one or more processors further perform:

applying the additional effect item to the game element of the type based on the user's designation of the type of the game element possessed by the user.

5. The information processing system according to claim 1, wherein, a game character is selected as the game element in the first selection; and a game item including the additional effect item is selected in the second selection.

6. The information processing system according to claim 1, wherein, the probability that the additional effect item is selected is 0 in the first selection.

7. The information processing system according to claim 1, wherein the one or more processors further perform: switching the type of the game element by applying the additional effect to the game element in accordance with a user's instruction.

8. The information processing system according to claim 1, wherein the game element is in-game content possessed by the user.

9. The information processing system according to claim 8, wherein the one or more processors perform: changing a display mode of the in-game content by applying the additional effect to the in-game content.

10. The information processing system according to claim 9, wherein the one or more processors perform: changing a color of at least a part of the in-game content by applying the additional effect to the in-game content.

11. The information processing system according to claim 1, wherein the game element to be selected in the first selection includes game elements of a first category and a second category,
the game elements of the first category include those having an additional effect and those not having the additional effect,
the gaming elements of the second category include only those that do not have the additional effect.

12. The information processing system according to claim 11, wherein in the first selection, on condition that the degree of the strengthening of the game element does not reach the upper limit, the probability of the game element of the first category being selected is lower than a probability of the game element of the second category being selected.

13. The information processing system according to claim 1, the one or more processors further perform: executing a game in which the stronger the game element is, the more the game proceeds advantageously.

14. The information processing system according to claim 13, wherein the additional effect is independent of whether the game proceeds advantageously.

15. A non-transitory storage medium having stored therein an information processing program that is executed by one or more processors, the information processing program configures the one or more processors to:
perform selection of game elements by means of a first selection in which any of a plurality of types of game elements can be selected, each type of game element includes one having an additional effect and one not having an additional effect;
strengthen the game element possessed by the user on condition that the game element selected in the first selection is already possessed by the user;
enable to apply the additional effect to the game element on condition that the game element selected in the first selection has the additional effect;
apply the additional effect to the game element to which the additional effect can be applied; and
perform a second selection in which a selection probability of an additional effect item is higher than that in the first selection on condition that a degree of the strengthening of the plurality of types of the game elements reaches an upper limit, wherein
the enabling enables to apply the additional effect to the game element possessed by the user on condition that the additional effect item is applied to the game element.

16. A non-transitory storage medium having stored therein an information processing program that is executed by one or more processors, the information processing program configures the one or more processors to:
perform selection of game elements by means of a first selection in which any of a plurality of types of game elements can be selected, each type of game element includes one having an additional effect and one not having an additional effect;
strengthen the game element possessed by the user on condition that the game element selected in the first selection is already possessed by the user;
enable to apply the additional effect to the game element in the case where the game element selected in the first selection has the additional effect; and
perform a second selection in which a selection probability of an additional effect item is higher than that in the first selection on condition that a degree of the strengthening of the plurality of types of the game elements reaches an upper limit, wherein
the enabling enables to apply the additional effect to the game element possessed by the user on condition that the additional effect item is applied to the game element.

17. An information processing apparatus comprising:
a memory storing a computer-readable program thereon; and
one or more processors, when executing the computer-readable program, that perform:
a first selection in which any of a plurality of types of game elements can be selected, each type of game element includes one having an additional effect and one not having an additional effect;
strengthening the game element possessed by the user on condition that the game element selected in the first selection is already possessed by the user;
enabling to apply the additional effect to the game element in the case where the game element selected in the first selection has the additional effect;
applying the additional effect to the game element to which the additional effect can be applied;
a second selection in which a selection probability of an additional effect item is higher than that in the first selection on condition that a degree of the strengthening of the plurality of types of the game elements reaches an upper limit; and
enabling to apply the additional effect to the game element possessed by the user on condition that the additional effect item is applied to the game element.

18. An information processing apparatus comprising:
a memory storing a computer-readable program thereon; and
one or more processors, when executing the computer-readable program, that perform:
a first selection in which any of a plurality of types of game elements can be selected, each type of game element includes one having an additional effect and one not having an additional effect;

strengthening the game element possessed by the user on condition that the game element selected in the first selection is already possessed by the user;

enabling to apply the additional effect to the game element in the case where the game element selected in the first selection has the additional effect;

a second selection in which a selection probability of an additional effect item is higher than that in the first selection on condition that a degree of the strengthening of the plurality of types of the game elements reaches an upper limit; and enabling to apply the additional effect to the game element possessed by the user on condition that the additional effect item is applied to the game element.

19. An information processing method performed in a computer of an information processing apparatus comprising:

performing selection of game elements by means of a first selection in which any of a plurality of types of game elements can be selected, each type of game element includes one having an additional effect and one not having an additional effect;

strengthening the game element possessed by the user on condition that the game element selected in the first selection is already possessed by the user;

enabling to apply the additional effect to the game element in the case where the game element selected in the first selection has the additional effect;

applying the additional effect to the game element to which the additional effect can be applied;

a second selection in which a selection probability of an additional effect item is higher than that in the first selection on condition that a degree of the strengthening of the plurality of types of the game elements reaches an upper limit; and enabling to apply the additional effect to the game element possessed by the user on condition that the additional effect item is applied to the game element.

* * * * *